United States Patent [19]

Yamagata et al.

[11] Patent Number: 5,129,071
[45] Date of Patent: Jul. 7, 1992

[54] ADDRESS TRANSLATION APPARATUS IN VIRTUAL MACHINE SYSTEM USING A SPACE IDENTIFIER FIELD FOR DISCRIMINATING DATOFF (DYNAMIC ADDRESS TRANSLATION OFF) VIRTUAL MACHINES

[75] Inventors: Ryo Yamagata; Hideo Sawamoto, both of Hadano; Hidenori Umeno, Kanagawa, all of Japan

[73] Assignee: Hitachi, Ltd., Tokyo, Japan

[21] Appl. No.: 331,756

[22] Filed: Apr. 3, 1989

[30] Foreign Application Priority Data

Apr. 6, 1988 [JP] Japan .................. 63-82921

[51] Int. Cl.$^5$ ..................... G06F 12/10; G06F 9/46
[52] U.S. Cl. .................... 395/400; 364/228.2; 364/246.2; 364/246.3; 364/256.4; 364/948.11; 364/955.5; 364/961.2; 364/966.4; 364/967.2; 364/967.4; 364/DIG. 1
[58] Field of Search ... 364/200 MS File, 900 MS File; 395/400

[56] References Cited

U.S. PATENT DOCUMENTS

| | | | |
|---|---|---|---|
| 4,145,738 | 3/1979 | Inoue et al. | 364/200 |
| 4,802,084 | 1/1989 | Ikegaya et al. | 364/200 |
| 4,812,969 | 3/1989 | Takagi et al. | 364/200 |
| 4,816,991 | 3/1989 | Watanabe et al. | 364/200 |
| 4,985,828 | 1/1991 | Shimizu et al. | 364/200 |

FOREIGN PATENT DOCUMENTS 57-23347 5/1982 Japan.
58-8073 2/1983 Japan.

*Primary Examiner*—Thomas C. Lee
*Assistant Examiner*—Ken S. Kim
*Attorney, Agent, or Firm*—Antonelli, Terry, Stout & Kraus

[57] ABSTRACT

An address translation apparatus is provided which has an address translation look-aside buffer with an entry composed of a real address field, virtual machine identifier field and space identifier field. For the translation look-aside buffer entry to be used by a general virtual machine which uses a plurality of address spaces, a virtual machine identifier for discrimination of a general virtual machine is stored in the virtual machine identifier field, and information used in discriminating an address space is stored in the space identifier field. For the translation look-aside buffer entry to be used by a dynamic address translation off (DATOFF virtual) machine which uses a single address space, an identifier commonly assigned to a group of DATOFF virtual machines is stored in the virtual machine identifier field, and a control block address used in discriminating a DATOFF virtual machine is stored in the space identifier field.

4 Claims, 5 Drawing Sheets

FIG. 4

CONTENTS OF EACH REGISTER IN VARIOUS MODES

| OPERATION MODE | VM IDENTIFICATION REG 12 | SPACE IDENTIFICATION REG 10 | DATOFF GUEST FLAG | |
|---|---|---|---|---|
| HOST | 0 | SEGMENT TABLE ORIGIN | 0 | ~410 |
| GENERAL GUEST | VALUE ASIGNED TO THE GUEST (2 OR MORE THAN 2) | SEGMENT TABLE ORIGIN | 0 | ~420 |
| DATOFF GUEST | 1 | GUEST CONTROL BLOCK ADDRESS | 1 | ~430 |

ADDRESS TRANSLATION APPARATUS IN VIRTUAL MACHINE SYSTEM USING A SPACE IDENTIFIER FIELD FOR DISCRIMINATING DATOFF (DYNAMIC ADDRESS TRANSLATION OFF) VIRTUAL MACHINES

BACKGROUND OF THE INVENTION

The present invention relates to an address translation apparatus in a virtual machine system, and more particularly to a control of a translation lookaside buffer suitable for the case where a number of virtual machines run in an address translation OFF mode.

In a virtual machine system, a single real machine is used time divisionally by setting virtual hardware information to each time slot so that the single real machine operates as if different machines run for respective time slots. Storage of a virtual machine is located on a virtual storage generated by a program (hereinafter referred to as a host) which supervises the real machine and realizes a virtual machine system. An access by a program (hereinafter referred to as a guest) running on a virtual machine, irrespective of whether it is a real or virtual address access, requires address translation by the host and storage in a translation look-aside buffer (hereinafter referred to as a TLB). A technique relevant to the system of this type is shown in, e.g., U.S. Pat. No. 4,456,954.

This conventional technique prepares two types of TLB entries for a host and presently running guest. There is disclosed in JP-B-58-8073 a method whereby the field of the TLB is extended by providing therein a virtual machine identification (hereinafter referred to as a VM identifier) for discrimination of a host and a plurality of guests. According to this method, the entries for both the host and, a plurality of guests are allowed to be present in the TLB at the same time, thus providing effective utilization of the TLB. A logical address stored in the TLB will be present therefore at high probability, thus improving the operation performance.

Further, according to JP-B-57-23347, an apparatus is disclosed wherein a space identifier and area identifier corresponding to the VM identifier are provided in a field of the TLB to discriminate among the address spaces of the host and a plurality of guests, thus realizing a multi virtual storage system.

The above conventional techniques are available on the assumption that the number of guests running at the same time is smaller than that capable of discrimination by a VM identifier. In the case where the number of guests running at the same time is larger than that a purge process of the TLB is required so that the advantageous performance of the above conventional techniques cannot be afforded. In order to solve such a problem, a sufficient number of bits may be assigned to a VM identifier. However, a VM identifier is a key element for the associative storage function of the TLB so that an increase in the bit number thereof results in an increased hardware cost.

Current address translation technology needs of a virtual machine system require an improved address translation operation that overcomes these problems and others to provide an address translation apparatus that has an advanced translation look-aside buffer for handling a number of guests without changing an interface of software and which reduces the overhead of address translation.

SUMMARY OF THE INVENTION

An object of the present invention is to hold the entries of a number of, guests within the TLB without changing the structure of the TLB.

In a virtual machine system, guests usually run on both an interactive type processing system using one guest per one terminal and a conventional type system for batch, on-line or other processings. In the former interactive type processing system, several hundreds of guests equal in number to that of terminals will run at the same time. Whereas in the latter conventional type system, the number of guests is several at most. A guest running on the former interactive type processing system is a guest which runs in a mode without address translation in order to reduce the overhead (this guest will be referred to hereinafter as a DATOFF (dynamic address translation off) guest.

In this mode, a virtual machine performs an address access by using only a real address for the virtual machine, which real address is a virtual address for the real machine.

According to the present invention, with the above fact taken into consideration, a group of DATOFF guests is assigned a single virtual machine, identifier VMID, and a space identifier field in the TLB is used to discriminate among the guests within the group.

According to the present invention, in the case of an ordinary or general guest, a VMID stored in the VMID field of the TLB is compared with the VMID of the running guest.

In the case of a DATOFF guest, a control block address stored in the space identifier field of the TLB is compared with a control block address of the running guest. In this case, a value common, to DATOFF guests is stored in the VMID field of the TLB.

Since a DATOFF guest is discriminated by using a space identifier field more guests can be discriminated.

BRIEF DESCRIPTION OF THE DRAWINGS

The invention may take a physical form in certain parts and arrangements of parts which will be described in detail in the specification and illustrated in the accompanying drawings which form a part of this application and wherein:

FIG. 4 is a diagram showing values set in registers in various modes; and

DESCRIPTION OF THE PREFERRED EMBODIMENTS

Figure 1:
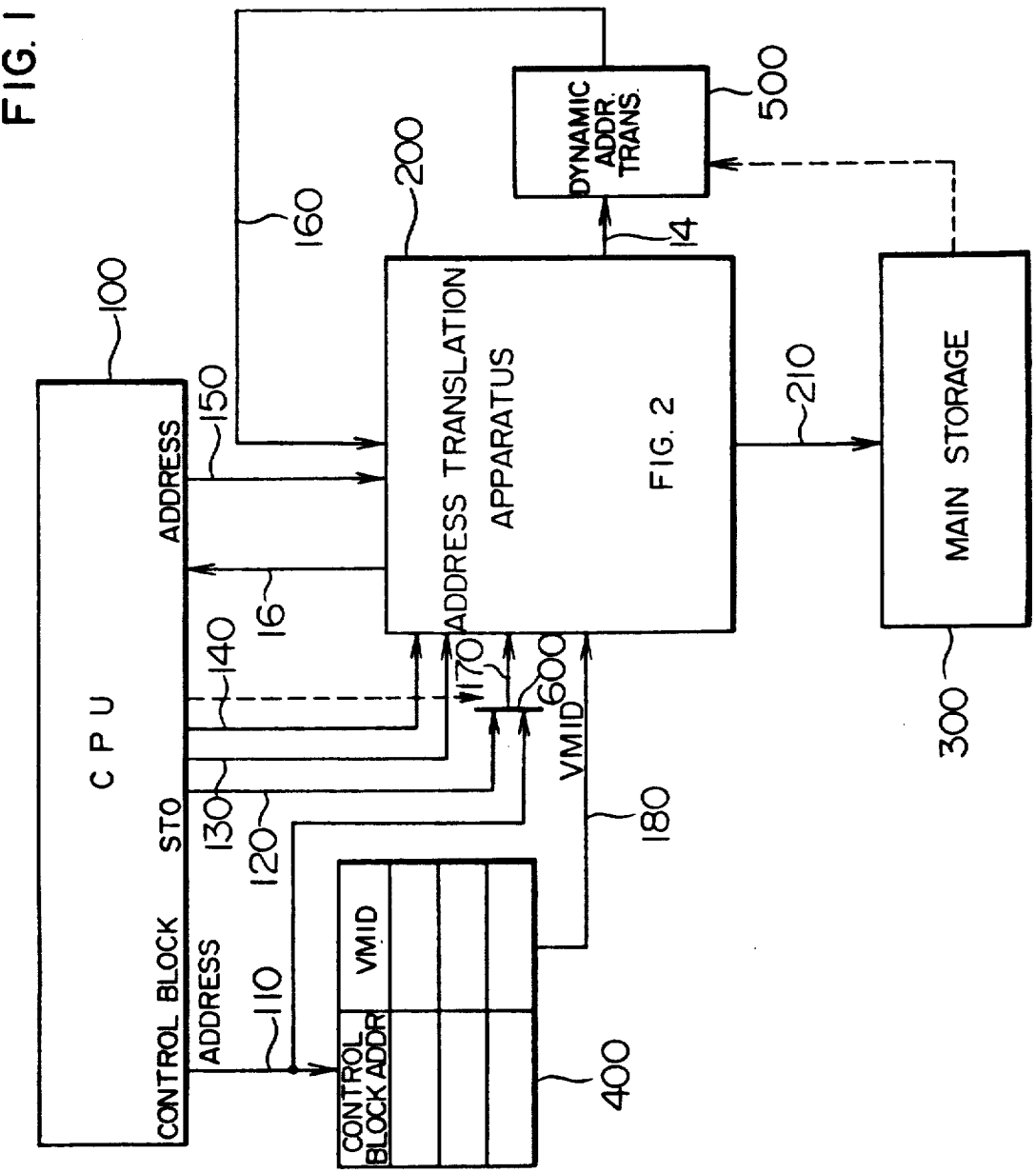
FIG. 1 is a block diagram showing a virtual machine system according to this invention.

FIG. 1 is a block diagram showing a virtual machine system according to the present invention.

CPU 100 executes a program realizing the virtual machine system. For execution of a guest, CPU 100 outputs a control block address, assigned independently to each guest, onto a line 110, a segment table origin (STO) onto a line 120 if the guest uses a plurality of spaces, information indicating whether the guest is a DATOFF guest, onto a line 130, and information indicating whether the address to be accessed is a real address or virtual address, onto a line 140.

VM stack 400 is a storage used for converting a control block address into a VMID which is stored in a TLB described later and used as a key wherein a VMID has less bits number than that of a control block address. If all the VMs are intended, to be discriminated by a VMID, then the number of the bits of VMID increases and hence the number of bits of the key portion in the TLB, accordingly disabling effective utilization of the TLB. For this reason, the control block address having a sufficient number of bits for discrimination of all the guests is converted into VMIDs at a VMID stack 400. VMID stack 400 stores pairs of a control block address and VMIDs assigned thereto. The control block address is used as a key for outputting a VMID.

An address translation apparatus 200 will be described later in detail with reference to FIG. 2. The function of the address translation apparatus 200 is to convert a logical address supplied from CPU 100 into an absolute address of a main storage 300.

A dynamic address translation (DAT) 500 is actuated by a signal 14 indicating that the address translation apparatus 200 cannot perform address translation. DAT 500 obtains an absolute address by using an address translation table in the main storage 300. An example of DAT 500 is shown in the above-referred U.S. Pat. No. 4,456,954.

A selector 600 selects either a control block address or a segment, table origin in accordance with an instruction from the CPU 100 and outputs it onto a line 170.

Figure 2:
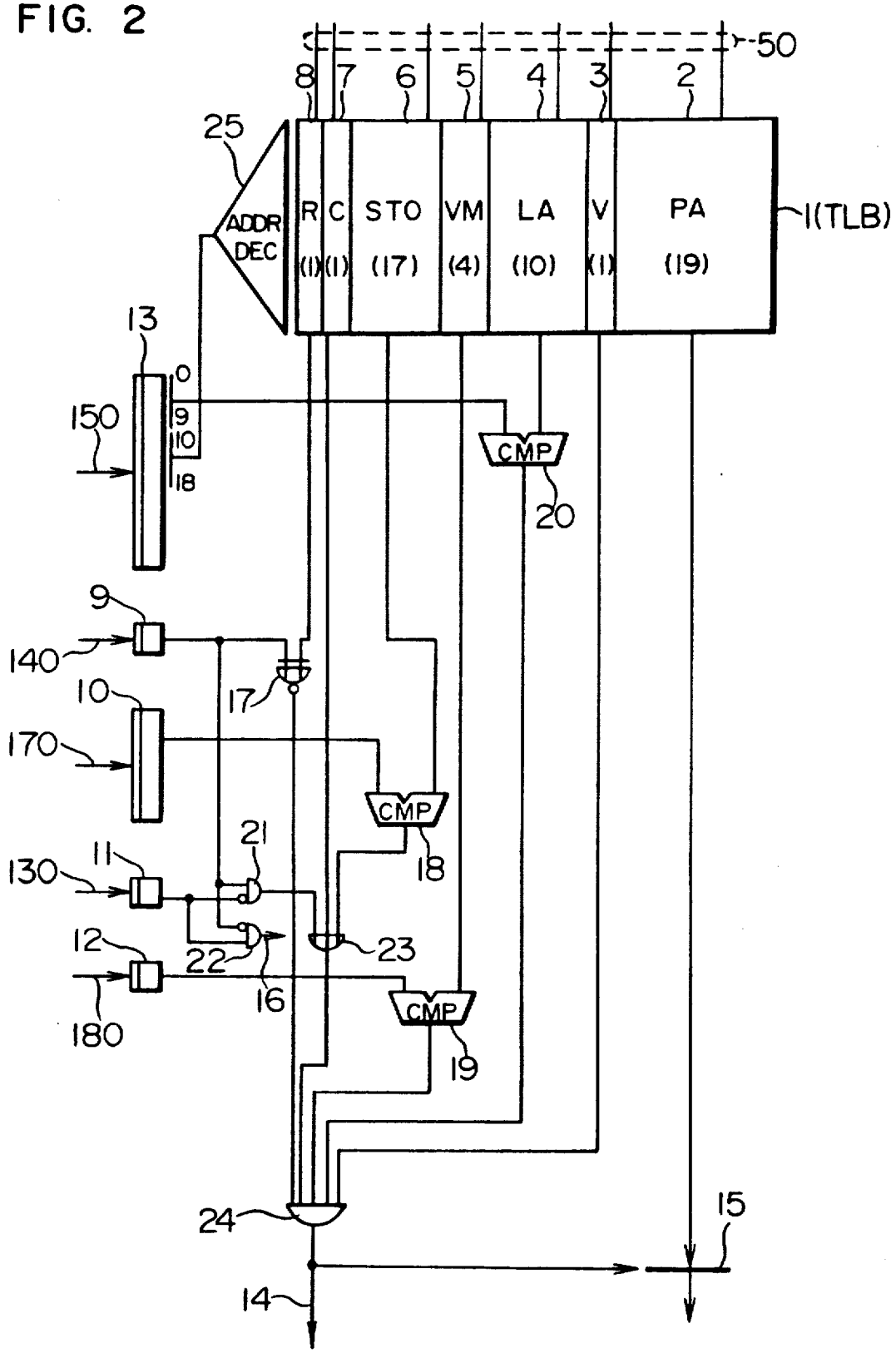
FIG. 2 is a logic circuit of an address translation apparatus.

FIG. 2 is a block diagram showing the address translation apparatus 200.

An entry of the TLB 1 includes an absolute address field (prefixed address PA) 2 for storing an absolute address, a valid flag (V) 3 for indicating entry validity, a logical address field (LA) 4 for storing a logical address, a VM identifier field (VMID) 5 for storing a VMID, a space identifier field (STO) 6 for storing a space identifier, a common segment field (C) 7 for indicating whether a common area of the main storage is used or not, and a real entry flag (R) 8 for indicating whether an entry is for a real or virtual address. In each field of the entry, a necessary, value is stored at the time of address translation via input leads 50.

A real access request flag 9 is set to "1" for a real address request, and to "0" for a virtual address request.

An EX-OR gate 17 compares the contents of the real entry flag 8 and real access request flag 9, and outputs "1" if the contents are coincident with each other.

A space identifier register 10 is set with the start address (STO) of the segment table in an ordinary case, but is also set with a control block address of the guest in another case. The difference of such operation will be described later. The control block address is assigned independently to each guest so that a different address indicates a different guest. The host manages so as not to change the address while the associated guest is present.

An STO comparator 18 compares the contents of the space identifier field 6 and space identifier register 10, and outputs "1" if the contents are coincident with each other.

A VM identifier register 12 is set to "0000" while the host is running. In this embodiment, the host is assigned a VMID of "0000". A VM identifier register 12 is set to "0001" while a DATOFF guest is running, and to another value except "0000" and "0001" assigned independently to each guest, i.e., a value of 2 or more in decimal notation, while the other guest is running.

A VMID comparator 19 compares the contents of the VM identifier field 5 and VM identifier register 12, and outputs "1" if the contents are coincident with each other.

An LA comparator 20 compares the content of the logical address field 4 with a part of the content of the access request address register 13, and outputs "1" if the contents coincide with each other.

A DATOFF guest flag 11 is set to "1" while a DATOFF guest is running, and to "0" while the other guest is running.

An AND gate 21 outputs "1" only when the content of the real access request flag 9 is "1" and the content of the DATOFF guest flag 11 is "0".

An AND gate 22 outputs "1" only when the content of the real access request flag 9 is "0" and the content of the DATOFF guest flag 11 is "1". This output signal "1" is used as a guest mode change signal which will be described later with reference to FIG. 5.

An OR gate 23 outputs "1" when one of the outputs from the common segment flag 7, STO comparator 18 and AND gate 21 is "1".

An AND gate 24 outputs "1" when all the outputs from the EX-OR gate 17, OR gate 23, VMID comparator 19 and LA comparator 20 are "1". This output signal "1" is used as a TLB coincidence signal 14 which causes a TLB output selector 15 to output the content of the absolute address field 2.

The operation of the circuit shown in FIG. 1 will be described. The operation including a host mode, general guest mode, and DATOFF guest mode will be described in this order.

(1) Host Mode

First, the host running operation will be described. Upon issuance of a main, storage access request, address information of represented by bits 10 to 18 in the access request address register 13 is decoded at an address decoder 25 to read out one entry in the TLB and perform coincidence judgement. In this case, the real access request flag 9 takes a value "1" for a real address access request, and "0" for a virtual address access request. The DATOFF guest flag 11 takes a value "0" because the host is running. For an access to the main storage by the host, the VM identifier register 12 takes, a value "0000" for a VMID of "0000". The space identifier register 10 is set with the start address of the segment table (refer to column 410 of FIG. 4).

(1-a) Issuance of Virtual Address by Host

Figure 3:
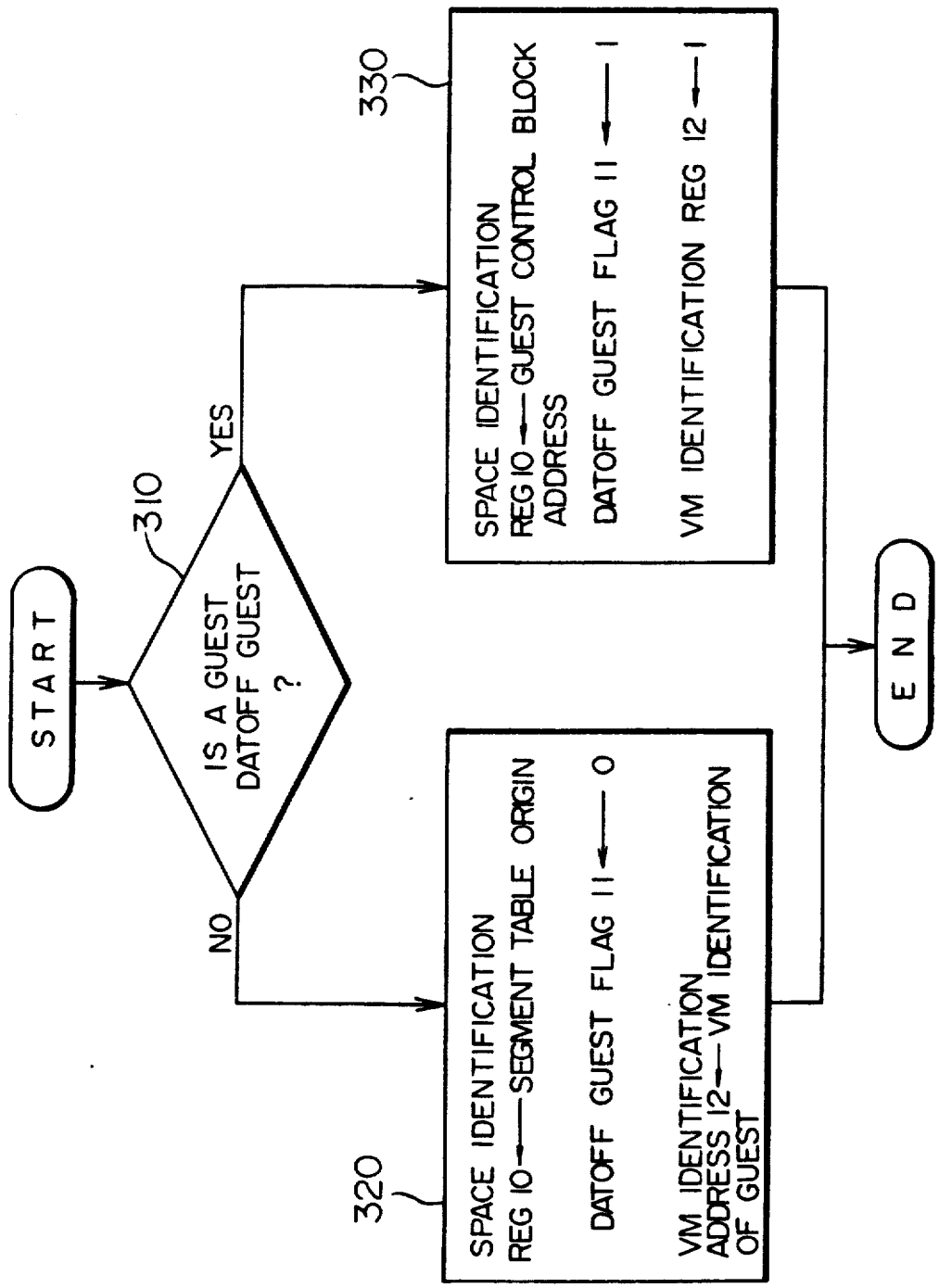
FIG. 3 is a flow chart illustrating the operation of setting registers upon actuation of a guest.

In this case, the real address request flag 9 is set with "0". The values to be later described with reference to FIGS. 3 and 4 are set respectively in the space identifier register 10, DATOFF guest flag 11, VM identifier register 12, and access request address register 13.

If the common segment flag 7 takes "0", since the output from the AND gate 21 takes "0", whether the output from the AND gate 24 takes "1" or not depends upon the comparison result by the STO comparator 18. If the contents of the space identifier register 10 and space field 6 are not coincident with each other, the output from the OR gate 23 becomes "0" so that a TLB coincidence signal cannot be obtained from the AND gate 24.

(1-b) Issuance of Real Address by Host

On the other hand, in the case where the host issues a real address request, the real address request flag 9 becomes "1". Since the output from the DATOFF guest register 11 is "0", the output from the AND gate 21 becomes "1", so that the output from the OR gate 23 becomes "1" irrespective of the output from the STO comparator 18. Consequently, if the other inputs the AND gate 24 are "1", a TLB coincidence is determined irrespective of the comparison result by the STO comparator 18.

In both the cases (1-a) and (1-b), if a requested address is not stored in the TLB, address translation is carried out by the dynamic address translation 500 to store the result in the TLB via the line 160 (refer to FIG. 1). Values set to the respective fields are as follows. Namely, an absolute address obtained through address translation is stored in the absolute address field 2, "1" in the valid flag 3, a part of the access request address 13 in the logical address field 4, a value of the VM identifier register 12 in the VM identifier field 5, a value of the space identifier register 10 in the space identifier field 6, a value of the common bits on the segment table entry obtained during address translation in the common segment flag 7, and a value of the real access request flag 9 in the real entry flag 8.

(2) General Guest Mode

Next, the operation of a general guest which performs address translation will be described. A general guest uses a plurality of address spaces.

The DATOFF guest flag 11 takes "0" similar to the case of the host guest. However, the VM identifier register 12 is set with a number (VM identifier) of the currently running guest, excepting "0000" or "0001".

This VM identifier is supervised by the VMID stack 400 (FIG. 1) which is a storage capable of searching a VM identifier representative of the running guest based on the control block address thereof, upon actuation of the guest.

The associated TLB search operation is similar to the case of the access request by the host. If the VM identifier meets a coincidence, then only the TLB entry for the guest now concerned, meets a coincidence. If there is no entry in the TLB to produce a coincidence, the contents for the registers and flags are set in the corresponding fields of the TLB in the similar manner as described with the "Host Mode".

(3) DATOFF Guest Mode

Next, the DATOFF guest running operation will be described. This mode uses a single address space.

The DATOFF guest flag 11 is set with "1", the VM identifier register with "0001", and the space identifier register 10 with the control block address of the guest, respectively under control of the host.

The guest of this type does not perform address translation so that, only a single real address space is present, and therefore it is not necessary for the guest to change the content of the space identifier register 10. Therefore, if once the control block address of the guest has been set in the space identifier register 10, the values set by the host are retained while the guest is running. Upon issuance of an access request by the guest, an entry is searched from the TLB entries which entry takes "0001" for the VM identifier field 5 and the same control block address of the guest for the space identifier field 6.

If an access request is a real address request and the real access request flag 9 takes a value "1", the output from the AND gate 21 becomes "0" because the DATOFF guest flag 11 takes "1". However, since the output from the STO comparator 18 becomes "1", the output from the OR gate 23 becomes "1", thus posing no problem.

If an entry of "1" is present for the common segment flag, the output from the OR gate 23 becomes "1" irrespective of the output from the STO comparator 18 so that even if non coincidence is met with respect to the value of the space identifier field 6, it is determined that the TLB entry is present. If there is no entry in the TLB to produce a coincidence, address translation is carried out and the result is stored in the TLB. In this case, the space identifier field 6 has stored therein a value of the current space identifier register 10, i.e., the guest control block address, and the VM identifier field 5 receives "0001". The other fields have stored therein those values similar to the case described with the "Host Mode". As described above, according to this embodiment, the space identifier field receives a control block address for use in discriminating a guest.

An initial setting process at the time of actuating a guest for allowing the above-described operation during execution of the guest will be described with reference to FIGS. 3 and 4. For actuation of a general guest (Step 310), a value designated by the guest is set in the space identifier register 10, "0" in the DATOFF guest flag 11, and a VM identifier obtained through search of the VMID stack in the VM identifier register 12 (Step 320, column 420). For actuation of a DATOFF guest (step 330, column 430), a guest control block address is set in the space identifier register 10, "1" in the DATOFF guest flag 11, and "1" in the VM identifier register 11. In this case, the information as to whether a guest is a DATOFF guest or not has been given within the guest control block under control of the host.

As seen from the embodiment, even if a TLB having a VM identifier field of a relatively small number of bits is used, address translation information for a number of DATOFF guests can be held in the TLB, thus advantageously improving the operation performance of a virtual machine system.

Further, in the above embodiment, the value of the VM identifier register has been fixedly assigned "0" for the host, "1" for the DATOFF guest, and "2 or more" for the general guest. However, as described in U.S. patent application Ser. No. 222767 filed on Jul. 22, 1988 assigned to the assignee of the present application, a new value may be assigned each time the TLB is purged.

Furthermore, in the above embodiment, it is necessary to determine beforehand which guest between a general guest and a DATOFF guest is to run. This is because a value should be set beforehand in the DATOFF guest flag 11. However, by using the guest mode change signal 16, the space identifier field can be used for discrimination of a guest even if the type of guest cannot be determined beforehand.

Figure 5:
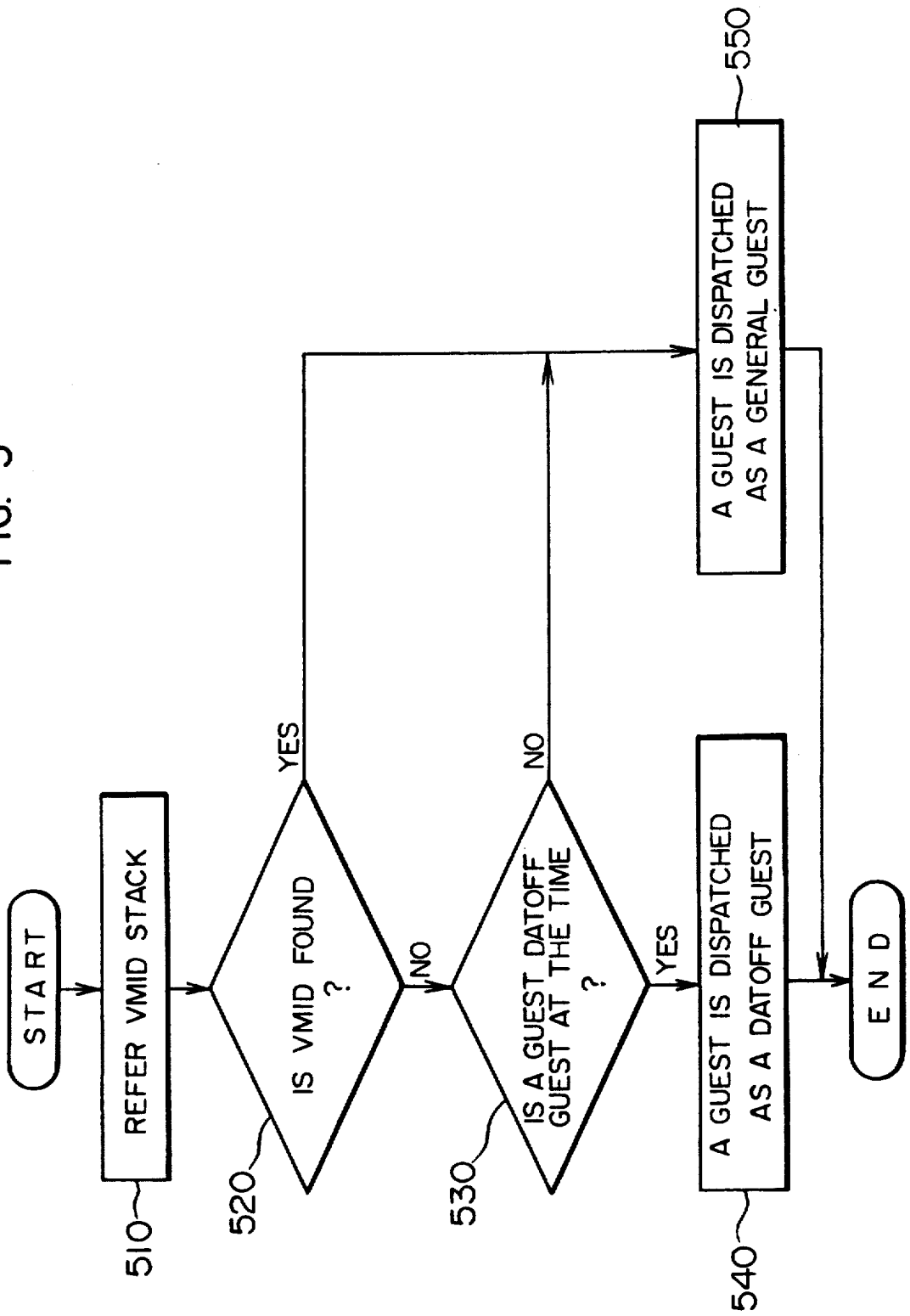
FIG. 5 is a flow chart illustrating the operation of actuating a guest which is not identified beforehand as to whether it is a DATOFF guest or not.

In particular, such an operation can be realized by a method whereby a guest is first actuated while considering it as a DATOFF guest, and the mode is changed if a virtual address access request issues during the guest running. The process of actuating a guest in such a case is shown in FIG. 5. The VMID stack 400 is referred to by using a control block address (Step 510). If the guest control block address is not stored in the VMID stack 400 (Step 520) and the guest to be actuated or dispatched is a DATOFF guest (Step 530), then the guest is actuated as the DATOFF guest (Step 540), or in the other case, the guest is actuated as the general guest (Step 550).

If the guest continues to run in the DATOFF mode, this operation becomes similar to the case where the mode can be determined beforehand as described previously. If the guest changes to the address translation mode during the course of its operation and issues a virtual address request, then the output from the real access request flag 9 becomes "0". Since the value of the DATOFF guest flag 11 is "1", the output from the AND gate 22 becomes "1" and the guest mode change signal 16 becomes "1". This signal indicating a host address translation exception is sent via the line 16 to CPU 100 so that a host interruption occurs. Upon reception of this interruption by the host, the mode is switched from the DATOFF guest mode to the general guest mode. Therefore, the status of the guest departs from the DATOFF state (Step 530) so that upon reactuation of the guest, it can be actuated as the general guest as shown in the flow chart of FIG. 5 (Step 550).

Thereafter, an instruction which issued the interruption is executed again to allow a mode change without any influence to the guest. According to the present embodiment, it is advantageous in that the space identifier field can be used for discrimination of a guest without the operational restriction that the type of guest is required to be designated beforehand.

According to a modification of the above embodiment, a host interruption may not be generated when the guest mode change signal 16 becomes "1", but the mode change is effected by hardware or microprograms.

According to the above embodiment, without using an additional interface with software, a DATOFF guest can be advantageously discriminated.

According to the present invention, the entries of a number of guests larger in number than that of guests capable of being determined by a VM identifier can be held in the TLB without changing the interface with software. Therefore, it is advantageous in that the overhead for address translation can be made small, and the system performance can be improved.

What is claimed is:

1. An address translation apparatus for a virtual machine for translating a logical address generated by a plurality of virtual machine operating upon a common real machine into a physical address, comprising:
   an address translation look-aside buffer having entries including a physical address field for storing a physical address corresponding to a logical address, a virtual machine identifier field for storing an identifier for discrimination of a virtual machine group, and a space identifier field for discrimination of a virtual machine or an address space of a virtual machine;
   first means, for a translation look-aside buffer entry of a first virtual machine which uses a plurality of address spaces, for storing first information used in discriminating said first virtual machine in said VM identifier field, and storing information used in discriminating an address space in said space identifier field;
   second means, for a translation look-aside buffer entry of a group of second virtual machines which use a single address space, for storing an identifier commonly assigned to the group of second virtual machines in said virtual machine identifier field, and storing second information used in discriminating said second virtual machine in said space identifier field; and
   third means for comparing information in said space identifier field of the address translation look-aside buffer with either information discriminating an address space or said second information, wherein, when said first virtual machine is operating, information discriminating an address space is used for the comparison, and when said second virtual machine is operating, said second information is used for the comparison;
   fourth means for comparing information in said virtual machine identifier field in the address translation look-aside buffer with either said first information or said identifier commonly assigned to the group of said second virtual machines, wherein, when said first virtual machine is operating, said first information is used for the comparison, and when said second virtual machine is operating, said commonly assigned identifier is used for the comparison;
   fifth means for generating a hit signal in response to coincidence detected in said third means and said fourth means; and
   sixth means for retrieving a physical address from a translation-lookaside-buffer entry when a hit signal is generated by said fifth means, thereby resulting in a translation of a logical address into said physical address.

2. An address translation apparatus for a virtual machine according to claim 1, wherein said first information is represented by a smaller number of bits than said second information; and said apparatus further comprises a virtual machine stack which converts said second information into the group identifier which is of the same type as said first information.

3. An address translation apparatus for a virtual machine according to claim 2, further comprising:
   means for detecting, after a virtual machine assigned a certain value of said second information for operating as said second virtual machine, that said virtual machine starts operating as said first virtual machine; and
   means for storing said first information corresponding to said second information in said virtual machine identifier field and storing an identifier used in discriminating an address space in said space identifier field.

4. An address translation apparatus for a virtual machine for translating a logical address generated by a plurality of virtual machines operating upon a common real machine into a physical address, comprising:
   an address translation look-aside buffer having entries including a physical address field for storing a physical address corresponding to a logical address, a virtual machine identifier field for storing an identifier for discrimination of a virtual machine group, and a space identifier field for discrimination of a virtual machine or an address space of a virtual machine;
   first register means for storing information which is to be compared with the content of said virtual machine identifier field in said address translation look-aside buffer;
   second register means for storing information which is to be compared with the content of said space identifier field of said address translation look-aside buffer;
   conversion means for converting first information used in discriminating a virtual machine into second information whose bit number is smaller than that of said first information;

first means for storing said second information in said first register means and storing information used in discriminating an address space in said space identifier field of the translation look-aside buffer, for running a first virtual machine which uses a plurality of address spaces;

second means for storing an identifier commonly assigned to the group of second virtual machines in said first register, and storing said first information used in discriminating said second virtual machine in said second register means, for running a second virtual machine which uses a single address space;

third means for comparing a content of said first register and said virtual machine identifier field;

fourth means for comparing a content of said second register and said space identifier field; and fifth means for generating a hit signal in response to coincidence detected in said third means and said fourth means; and sixth means for retrieving a physical address from a translation-lookaside-buffer entry when a hit signal is generated by said fifth means, thereby resulting in a translation of a logical address into said physical address.

* * * * *